(12) United States Patent
Kusunoki

(10) Patent No.: US 9,349,999 B2
(45) Date of Patent: May 24, 2016

(54) ELECTRIC STORAGE APPARATUS

(71) Applicant: Lithium Energy Japan, Kyoto-shi (JP)

(72) Inventor: Toshiki Kusunoki, Ritto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 105 days.

(21) Appl. No.: 14/074,652

(22) Filed: Nov. 7, 2013

(65) Prior Publication Data

US 2014/0141306 A1    May 22, 2014

(30) Foreign Application Priority Data

Nov. 19, 2012 (JP) .................... 2012-253467

(51) Int. Cl.
 *H01M 2/10* (2006.01)
(52) U.S. Cl.
 CPC .......... *H01M 2/1016* (2013.01); *H01M 2/1022* (2013.01); *H01M 2/1072* (2013.01); *H01M 2/1077* (2013.01)

(58) Field of Classification Search
None
See application file for complete search history.

(56) References Cited

U.S. PATENT DOCUMENTS

2008/0096072 A1*  4/2008  Fukusako et al. ............... 429/26
2010/0081041 A1*  4/2010  Okada et al. .................... 429/82

FOREIGN PATENT DOCUMENTS

| JP | 2003-346749 A | 12/2003 |
| JP | 2008-277042 A | 11/2008 |
| JP | 2011-175743 A | 9/2011 |

* cited by examiner

*Primary Examiner* — Patrick Ryan
*Assistant Examiner* — Christopher Domone
(74) *Attorney, Agent, or Firm* — McGinn IP Law Group, PLLC

(57) ABSTRACT

An electric storage apparatus includes a battery cell, an accessory, a holding member for holding the battery cell and the accessory so that the battery cell and the accessory are on opposite sides, and a fixing member for fixing the accessory to the holding member. A distance between the fixing member and the battery cell is set to be equal to or larger than a distance between the holding member and the battery cell.

19 Claims, 5 Drawing Sheets

ELECTRIC STORAGE APPARATUS

CROSS-REFERENCE TO RELATED APPLICATIONS

This application claims priority of Japanese Patent Application No.: 2012-253467 filed on Nov. 19, 2012, the content of which is incorporated herein by reference.

FIELD

The present invention relates to an electric storage apparatus.

BACKGROUND

Conventional battery modules as an example of an electric storage apparatus include a type where a plurality of battery cells are arranged in parallel and stored in a casing (Refer to, e.g., JP 2003-346749 A).

However, in the conventional battery module as disclosed in JP 2003-346749 A, the battery cells are integrated by being held between resin frames (holding members) at both ends by use of through bolts disposed along the battery cells arranged in parallel. Therefore, a part of internal space of the module is occupied by the through bolts, disadvantageously causing increase in size. Disclosed in JP 2003-346749 A is that an electrical component (control device) is disposed in a side plate cover attached to the resin frame, but the fixation structure of the electrical component is not described.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an electric storage apparatus that prevents protrusion of a fixing member for fixing an accessory toward a battery cell and thereby avoids occupation of an internal space of the electric storage apparatus by the fixing member and damage to the battery cell caused by the fixing member.

An aspect of the present invention provides an electric storage apparatus comprising, a battery cell, an accessory, a holding member for holding the battery cell and the accessory so that the battery cell and the accessory are on opposite sides, and a fixing member for fixing the accessory to the holding member, wherein a distance between the fixing member and the battery cell is set to be equal to or larger than a distance between the holding member and the battery cell.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

Figure 1:
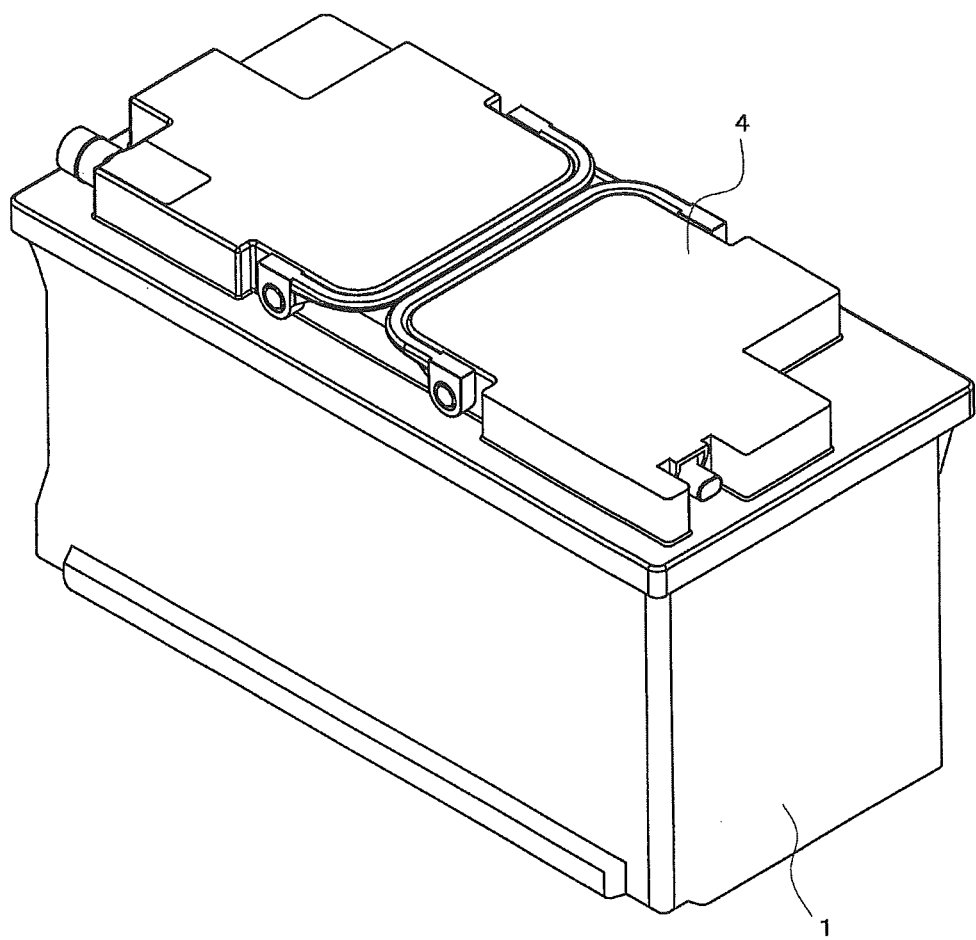
FIG. 1 is a perspective view of a battery module according to an embodiment.

An aspect of the present invention provides an electric storage apparatus comprising, a battery cell, an accessory, a holding member for holding the battery cell and the accessory so that the battery cell and the accessory are on opposite sides, and a fixing member for fixing the accessory to the holding member, wherein a distance between the fixing member and the battery cell is set to be equal to or larger than a distance between the holding member and the battery cell.

With this arrangement, the fixing member is prevented from protruding toward the battery cell beyond the holding member. This can avoid that the fixing member interferes with the battery cell.

Preferably, the holding member has a recessed section for preventing the fixing member from protruding toward the battery cell.

With this arrangement, even when the holding member is thin, the recessed section can prevent the protrusion of the fixing member toward the battery cell by modifying an arrangement of the holding member so that the recessed section is formed.

Preferably, an auxiliary member is arranged between the holding member and the battery cell, and the auxiliary member has an opening for preventing the fixing member from protruding toward the battery cell.

With this arrangement in which the opening is merely formed in the added auxiliary member, the fixing member can be prevented from protruding toward the battery cell.

Preferably, the holding member comprises end plates arranged on both sides of the battery cell, and at least one of the end plates includes the opening or the recessed section.

With this arrangement, the component originally built in the casing, i.e. the end plate, can constitute the holding member. Moreover, the opening or the recessed section formed in the end plate can prevent the fixing member from protruding toward the battery cell.

Preferably, the fixing member has a first part and a second part, the first part has a larger sectional area than the second part, and the first part faces the battery cell.

With this arrangement, even when the fixing member protrudes toward the battery cell due to an external force such as shock being applied to thereto, the protruding part of the fixing member has larger sectional area and thereby the shock applied to the battery cell is reduced.

The fixing member may include a bolt and a nut. The bolt includes a head arranged in the opening or the recessed section and a shaft extending from the head and formed with a male screw. The nut is screwed to the male screw of the shaft.

With this arrangement, by arranging the head of the bolt in the opening or the recessed section and causing the shaft to penetrate into the accessory to screw the bolt into the nut, the accessory can be fixed to the holding member.

According to the present invention, the accessory is fixed to the holding member and the fixing member for the fixation is not protruded toward the battery cell by setting the distance between the fixing member and the battery cell equal to or larger than the distance between the holding member and the battery cell. This can prevent the fixing member from protruding toward the battery cell to interfere with the battery cell, and thereby damage of the battery cell can be prevented.

An embodiment according to the present invention will be described with reference to appended drawings. In following description, terms indicating particular directions and locations (such as terms including "upper, "lower", "side", and "end") are used, and these terms serve to promote understanding of the present invention with reference to the drawings and do not limit the technical scope of the present invention. Further, the following description is only an example, and does not intend to limit the present invention, applied products, and usage.

Figure 2:
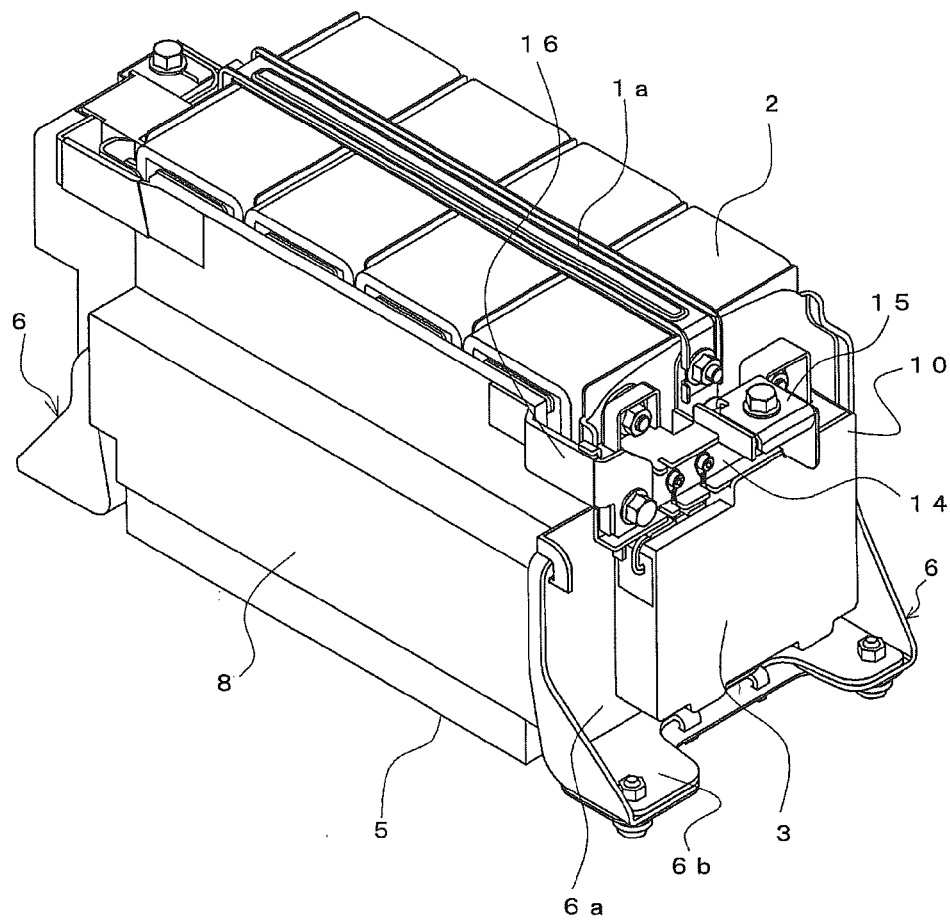
FIG. 2 is a perspective view showing the state where a casing and a cover are removed from the state shown in FIG. 1.

FIG. 1 shows a battery module according to an embodiment of the present invention. In general, the battery module has an arrangement in which battery cells 2 and an electrical component 3 as an example of an accessory in FIG. 2 are stored in a casing 1 closed with a cover 4.

The casing 1 is made of a synthetic resin material and shaped to a substantially rectangular parallelepiped form having an opened upper surface. A bottom plate 5 is arranged on a bottom surface of the casing 1. As shown in FIG. 2, end plates 6 are arranged at both ends of the bottom plate 5. The bottom plate 5 and the end plates 6 are fixed to the bottom surface of the casing 1 with screws.

Each of the battery cells 2 is a nonaqueous electrolyte secondary battery such as a lithium-ion battery. Although not shown, for example, a power-generating element is stored in a battery container and the container is sealed with a cover. The plurality of battery cells 2 (four battery cells in this embodiment) are arranged in parallel between the end plates 6 on the bottom plate 5. A plate-like spacer 7 is interposed between adjacent battery cells 2. These battery cells 2 are guided by two side plates 8 and a top plate 9 fixed so as to be elongated between the end plates 6.

Figure 4:
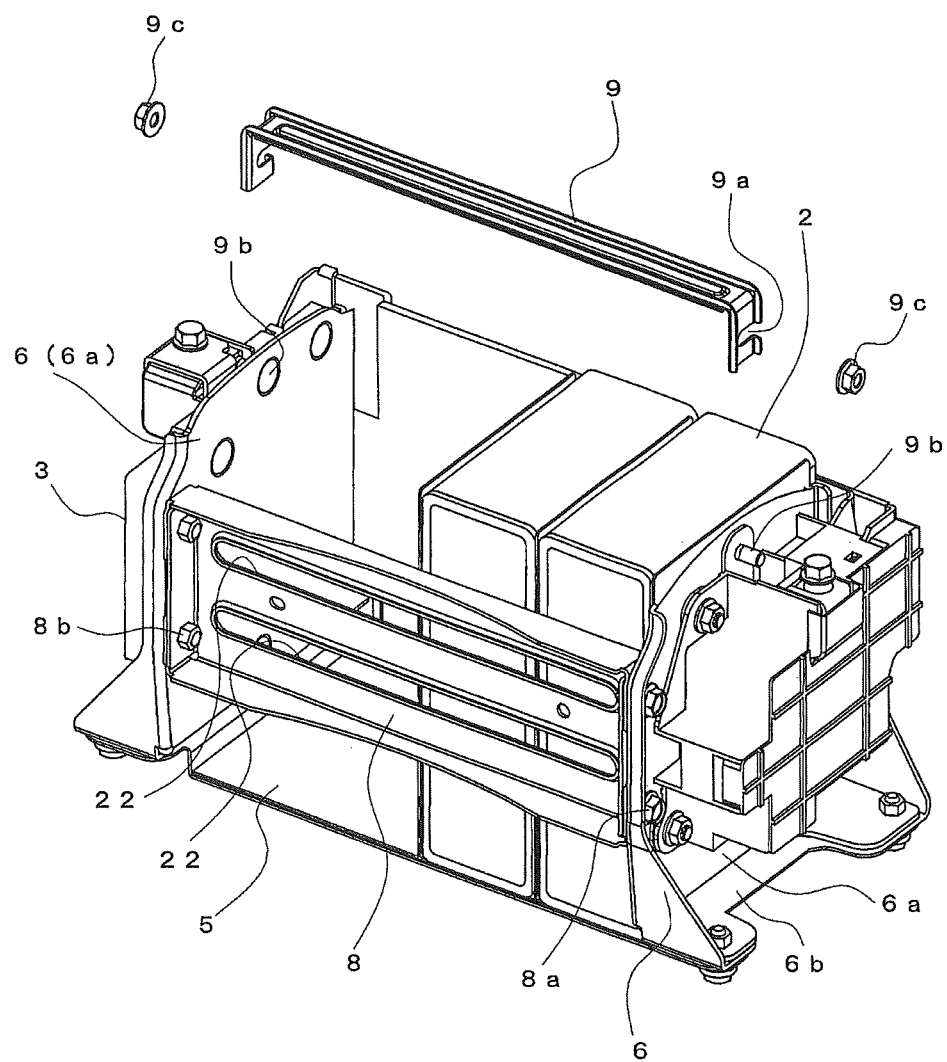
FIG. 4 is a perspective view showing the state where a top plate is detached and some battery cells are omitted from the state shown in FIG. 3, when viewed from other angle.

As shown in FIG. 4, one of side plates 8 has a substantially rectangular shape, and is bent at right angles on its periphery to form a side wall. The side plate 8 is formed with elongated two rows of openings. The other side plate 8 has a box-shape and is foil led with an opening on its inner surface. Both of the side plates 8 are arranged so as to be elongated between the end plates 6 and fixed to the both end plates 6 with bolts 8a and nuts 8b.

The top plate 9 is formed by bending a narrow plate member at right angles at its both ends and formed with notches 9a at the both ends. Both sides of the top plate 9 are bent at substantially right angles to increase the strength of the top plate 9. The top plate 9 is arranged so that the both ends thereof are located on outer surfaces of the end plates 6 and fixed to the both end plates 6 with bolts 9b and nuts 9c.

Figure 3:
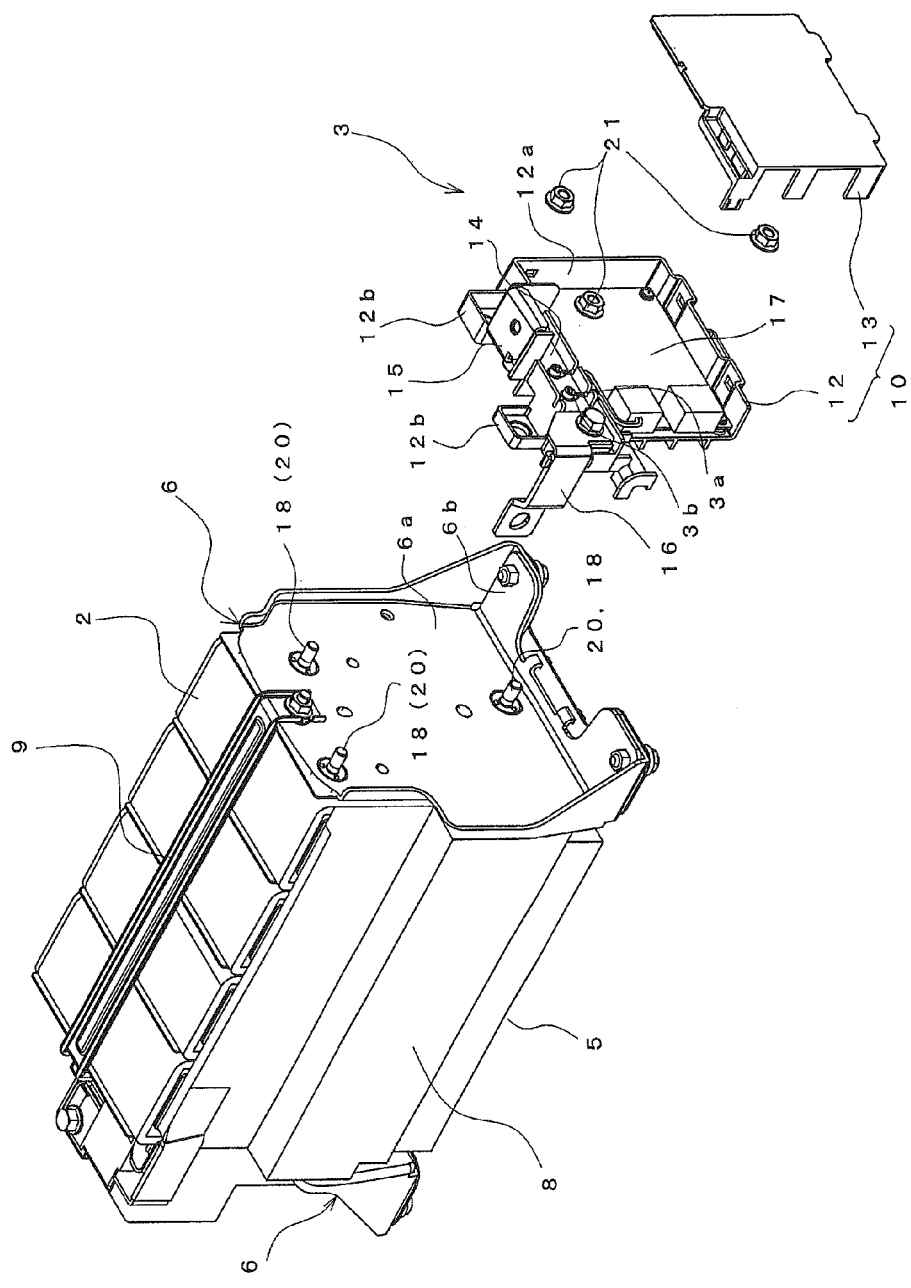
FIG. 3 is an exploded perspective view showing the state where an electrical component is detached from the state shown in FIG. 2.

As shown in FIG. 3, the electrical component 3 is formed by accommodating a board 17 with electronic appliance such as a CPU in a housing 10. The housing 10 includes a main body 12 and a cover 13. The main body 12 includes an accommodation section 12a covered by the cover 13 and fixing sections 12b at three places (two upper places and one lower place) that protrude outward from the accommodation section 12a. The accommodation section 12a is surrounded with the side walls, and the board 17 is screwed to a bottom surface of the accommodation section 12a.

A plurality of harnesses are drawn from the electrical component 3. Among the harnesses, front ends (round terminals 3b) of two power-feeding harnesses 3a are screwed into the main body 12 of the housing 10 together with a first bus bar 14. The first bus bar 14 is a conductive plate that is screwed into the main body 12 of the housing 10 together with a second bus bar 15 at one end and into the main body 12 of the housing 10 together with a third bus bar 16 at the other end. The second bus bar 15 is formed by bending a conductive plate at right angles and includes a vertical section screwed into one portion of the main body 12 together with the first bus bar 14 as described above and a horizontal section screwed into another portion of the main body 12. The third bus bar 16 is formed by bending a conductive plate at right angles. One end of the third bus bar 16 is screwed together with the first bus bar 14 as described above, whereas the other end is coupled to an electrode terminal of the battery cell 2.

In this manner, the first through third bus bars 14 to 16 are screwed into the main body 12 of the housing 10, and the main body 12 is also fixed to the battery cell 2 with the end plate 6 interposed therebetween. Therefore, the main body 12 of the housing 10 can be properly positioned with respect to the end plate 6.

Each of the fixing sections 12b is surrounded with an auxiliary wall that protrudes less than the side wall of the main body 12. A shaft 20 of a bolt 18 protrudes from the end plate 6 at the center of the bottom surface of the fixing section 12b.

As shown in FIGS. 5, the bolt 18 includes a head 19 and the shaft 20 extending from the center of the head 19.

The head 19 has a disk shape and is located in a recessed section 22 formed in the end plate 6. A thickness of the head 19 is set to be equal to or smaller than a depth of the recessed section 22. Therefore, the head 19 of the bolt 18 does not protrude inward from the end plate 6. That is, the head 19 is configured so as not to protrude toward the battery cells 2 and interfere with the spacer and the like. Even when an the bolt 18 is pressed onto the battery cell 2 by an external force applied thereto, a larger surface (that is, the head 19) of the bolt 18 contacts with the battery cell 2 so that damage applied to the battery cell 2 is small.

The shaft 20 has a male screw 20a into which a nut 21 is threaded when the shaft 20 passes through the fixing section 12b.

Figure 5A:
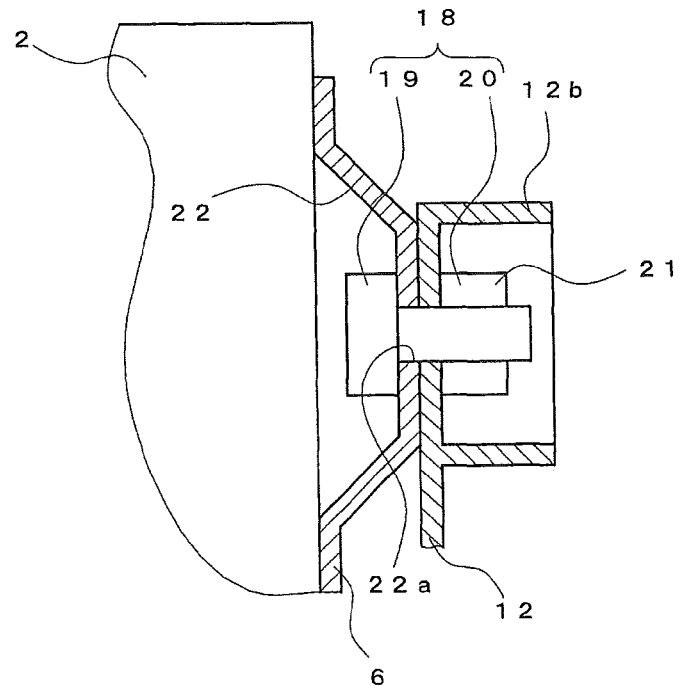
FIG. 5A is a sectional view showing an end plate, the battery cell, and the electrical component according to one embodiment.
Figure 5B:
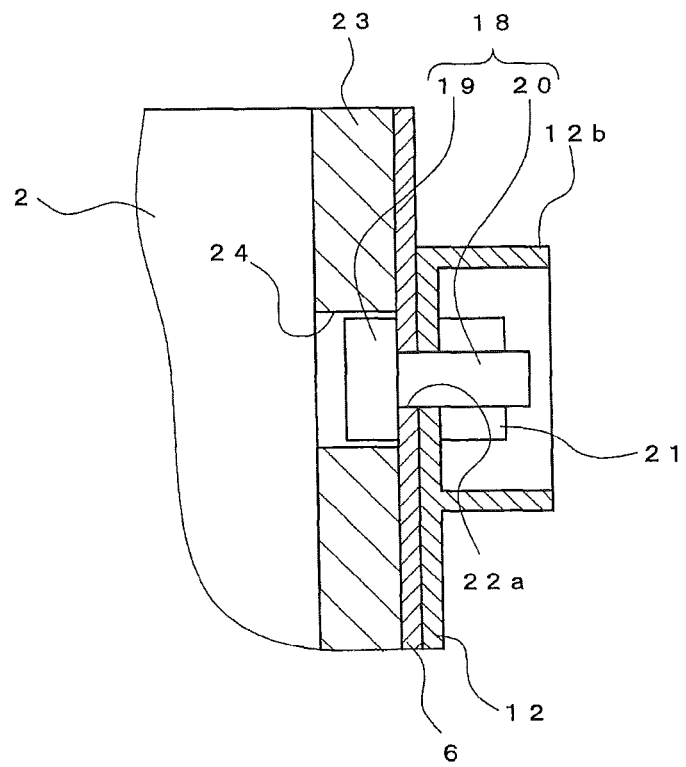
FIG. 5B is a sectional view similar to the FIG. 5A according to other embodiment.

As shown in FIG. 3, the end plate 6 is a metal plate, and includes a vertical section 6a to which the electrical component 3 is fixed and fixed sections 6b protruding at right angles from both corners of the lower end of the vertical section 6a. Further, as shown in FIG. 5A the recessed section 22 is formed so as to extend outward from the inner surface of the end plate 6. The recessed section 22 is circular in a plan view, and has a cone shape in which an inner circumferential surface is gradually tapered toward the center. The depth of the recessed section 22 is set to be larger than a height of the head 19 of the bolt 18. A through hole 22a is formed at the center of the bottom surface of the recessed section 22 and the shaft 20 of the bolt 18 can be inserted into the through hole 22a.

The cover 4 is a synthetic resin plate, and has an exhaust section and the like.

Then, a method of assembling the battery module having the arrangement will be described.

First, the end plates 6 are temporarily fixed to the both respective ends of the bottom plate 5. Then, the end plates 6 are coupled to each other with the side plates 8.

Subsequently, the electrical component 3 is arranged on the outer surface of each end plate 6. Here, the shaft 20 of the bolt 18 is inserted into the through hole of the recessed section 22 from the inner surface of the end plate 6. The shaft 20 of the bolt 18 is inserted into the through hole of the fixing section 12b formed in the housing 10 of the electrical component 3. The male screw of the shaft 20 is threaded into the nut 21, thereby coupling the end plate 6 to the main body 12 of the housing 10. At this time, the head 19 of the bolt 18 is located in the recessed section 22 formed in the end plate 6, and does not protrude inward.

The battery cells 2 are arranged in parallel in a region defined by the bottom plate 5, the end plates 6, and the side plates 8. Then, the central portions of the upper ends of the end plates 6 are coupled to each other with the top plate 9 by use of bolts 9*b* and nuts 9*c*. Electrode terminals of the battery cells 2 are coupled to one another with the bus bar, and the third bus bar 16 is coupled to the electrode terminal of one of the battery cells 2 at both ends.

After that, the round terminals 3*b* of the harnesses 3*a* extending from the electrical component 3 are screwed to the main body 12 of the housing 10 together with the first bus bar 14. One end of the first bus bar 14 together with the second bus bar 15 and the other end of the first bus bar 14 together with the third bus bar 16 are screwed to the main body 12 of the housing 10. Further, the horizontal section of the second bus bar 15 is screwed to the main body 12 of the housing 10.

Finally, the members thus assembled are stored in the casing 1 and screwed to the bottom surface of the casing 1. Then, the upper opening of the casing 1 is closed with the cover 4, completing the assembly of the battery module.

In the completed battery module, the head 19 of the bolt 18 is located in the recessed section 22 formed in the end plate 6. This prevents the bolt 18 from protruding toward the battery cells 2 and interfering with the battery cells that cause any failure such as a damage. Even when the bolt 18 is pressed onto the battery cell 2 due to an external force applied thereto, a larger surface (that is, the head 19) of the bolt 18 contacts with the battery cell 2 and thereby damage applied to the battery cell 2 is small.

The present invention is not limited to the arrangement described in the embodiment, and may be variously modified.

For example, in the embodiment, the head 19 of the bolt 18 is located in the recessed section 22 formed in the end plate 6. However, the arrangement shown in FIG. 5B may be adopted. That is, a backing plate 23 is arranged between the end plate 6 and the battery cells 2. The backing plate has an opening 24, and the head 19 of the bolt 18 is located in the opening 24.

With this arrangement, merely by adding the backing plate 23, the head 19 of the bolt 18 can be prevented from protruding toward the battery cells 2.

Further, in the embodiment, the accessory is an electrical component (such as sensor, board and so on). However, another part such as a part of the top plate for coupling the end plates 6 to each other or a part of a restraining belt disposed separately for pulling the separate end plates 6 to each other may be regarded as the accessory, and have the same arrangement as the electrical component. In this case, a part on the opposite side to the battery cells 2 with respect to the end plates 6 interposed therebetween, in the top plate 9 or the restraining belt, serves as the accessory.

In the embodiment, the battery cells 2 are lithium-ion batteries. However, the battery cells 2 may be various types of batteries such as lead acid batteries. Although the battery module including the plurality of battery cells 2 are used, the single battery cell 2 or a battery pack including the plurality of battery modules may adopt the above-mentioned arrangement.

In the embodiment, the bolt 18 is used as the fixing member; however, any suitable member other than the bolt 18 (e.g. rivet) may be used. In this case, it is preferred to arrange the fixing member so that an area of the surface facing the battery cells 2 becomes large. The nut may not be used.

In the fixing member, the profile area (or sectional area) of the part facing the battery cells 2 only needs to be larger than the profile area (or sectional area) of the part coupled to the accessory. Thereby, even when the surface of the part facing the battery cells 2 is not formed in a flat shape, but is formed in a projected shape, recessed shape, an irregular shape, or the like, with the large profile area (or sectional area) of the part that is directly affected by hitting against the battery cell 2, the possible damage of the battery cells 2 can be reduced. The profile area (sectional area) used herein refers to the profile area (sectional area) of a plane parallel to a case of the cell facing the fixing member.

What is claimed is:

1. An electric storage apparatus, comprising:
a battery cell;
an accessory;
a holding member including a first side and a second side for holding the battery cell and the accessory, respectively, the first and second sides being opposite sides; and
a fixing member for fixing the accessory to the holding member, the fixing member including a first part and a second part, the first part having a larger sectional area than the second part, the first part being placed on the first side,
wherein, at a placing part of the first side where the first part is placed, a distance between the first part and the battery cell is set to be equal to or larger than a distance between the first side and the battery cell, and
wherein the first side faces the battery cell such that the distance between the first side and the battery cell is less than a distance between the second side and the battery cell.

2. The electric storage apparatus according to claim 1, wherein the holding member includes a recessed section for preventing the fixing member from protruding toward the battery cell.

3. The electric storage apparatus according to claim 1, wherein the holding member includes an opening for preventing the fixing member from protruding toward the battery cell.

4. The electric storage apparatus according to claim 2, wherein the holding member comprises end plates arranged on both sides of the battery cell, and
wherein at least one of the end plates includes the recessed section.

5. The electric storage apparatus according to claim 3, wherein the holding member comprises end plates arranged on both sides of the battery cell, and
wherein at least one of the end plates includes the opening.

6. The electric storage apparatus according to claim 2, wherein the fixing member includes a bolt and a nut, the bolt including a head arranged in the recessed section and a shaft extending from the head and formed with a male screw, and the nut being screwed to the male screw of the shaft.

7. The electric storage apparatus according to claim 1, wherein the second part is protruded from the second side.

8. The electric storage apparatus according to claim 1, wherein the holding member includes a plate-shaped portion that includes the first and second sides.

9. The electric storage apparatus according to claim 1, wherein the fixing member further includes a third part having a larger sectional area than the second part.

10. An electric storage apparatus, comprising:
a battery cell;
an accessory;

a holding member including a first side and a second side for holding the battery cell and the accessory, respectively, the first and second sides being opposite sides; and a fixing member for fixing the accessory to the holding member, the fixing member including a first part and a second part, the first part having a larger diameter than the second part, the first part being placed on the first side, wherein, at a placing part of the first side where the first part is placed, a distance between the first part and the battery cell is set to be equal to or larger than a distance between the first side and the battery cell, and wherein the first side faces the battery cell such that the distance between the first side and the battery cell is less than a distance between the second side and the battery cell.

11. The electric storage apparatus according to claim 10, wherein the second part is protruded from the second side.

12. The electric storage apparatus according to claim 10, wherein the holding member includes a plate-shaped portion that includes the first and second sides.

13. The electric storage apparatus according to claim 10, wherein the fixing member further includes a third part having a larger diameter than the second part.

14. An electric storage apparatus, comprising:
a plurality of battery cells arranged in a first direction;
an accessory;
a holding member including a first side and a second side for holding the battery cells and the accessory, respectively, the first and second sides being opposite sides; and a fixing member for fixing the accessory to the holding member, the fixing member including a first part and a second part, the first part having a larger diameter than the second part, the first part being placed on the first side, wherein, in the first direction, a distance between the first part and the battery cells is set to be equal to or larger than a distance between the first side and the battery cells, and wherein the first side faces the battery cells such that the distance between the first side and the battery cells is less than a distance between the second side and the battery cells.

15. The electric storage apparatus according to claim 14, wherein, at a placing part of the first side where the first part is placed, the distance between the first part and the battery cells is set to be equal to or larger than the distance between the first side and the battery cells.

16. The electric storage apparatus according to claim 14, wherein the second part is protruded from the second side.

17. The electric storage apparatus according to claim 14, wherein the holding member includes a plate-shaped portion that includes the first and second sides.

18. The electric storage apparatus according to claim 14, wherein the fixing member further includes a third part having a larger diameter than the second part.

19. The electric storage apparatus according to claim 1, wherein the first part faces the battery cell.

* * * * *